US009323443B2

(12) United States Patent
Kritt et al.

(10) Patent No.: US 9,323,443 B2
(45) Date of Patent: *Apr. 26, 2016

(54) DRILLING OF DISPLAYED CONTENT IN A TOUCH SCREEN DEVICE

(75) Inventors: Barry A. Kritt, Raleigh, NC (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 349 days.

This patent is subject to a terminal disclaimer.

(21) Appl. No.: 13/462,768

(22) Filed: May 2, 2012

(65) Prior Publication Data

US 2013/0293480 A1    Nov. 7, 2013

(51) Int. Cl.
| | |
|---|---|
| G06F 3/041 | (2006.01) |
| G06F 3/0488 | (2013.01) |
| G06F 17/24 | (2006.01) |
| G06F 17/30 | (2006.01) |

(52) U.S. Cl.
CPC .......... *G06F 3/0488* (2013.01); *G06F 3/04883* (2013.01); *G06F 17/246* (2013.01); *G06F 17/30395* (2013.01); *G06F 17/30554* (2013.01)

(58) Field of Classification Search
CPC .......... G06F 3/04883; G06F 17/30554; G06F 17/30395; G06F 3/0488; G06F 17/246
USPC ........................................................ 715/863
See application file for complete search history.

(56) References Cited

U.S. PATENT DOCUMENTS

| | | | | |
|---|---|---|---|---|
| 6,525,749 | B1 * | 2/2003 | Moran et al. | 715/863 |
| 6,628,312 | B1 * | 9/2003 | Rao et al. | 715/853 |
| 6,993,533 | B1 * | 1/2006 | Barnes | |
| 7,712,043 | B2 | 5/2010 | Li et al. | |

(Continued)

FOREIGN PATENT DOCUMENTS

| | | |
|---|---|---|
| CN | 1877505 | 12/2006 |
| CN | 102224488 | 10/2011 |

OTHER PUBLICATIONS iPhone Dev SDK, The community for the iPhone developer community, "Interface Builder creating multi-level drill down" downloaded Feb. 20, 2012, 7 pages, www.iphonedevsdk.com/forum/iphone-sdk-development., posts dated Jul., 2008, copyright 2002-2012, Jelsoft Enterprises Ltd.

(Continued)

*Primary Examiner* — Jennifer To
*Assistant Examiner* — John Repsher, III
(74) *Attorney, Agent, or Firm* — Kunzler Law Group; Damion Josephs (57) ABSTRACT

Systems and computer program products may provide drilling of displayed content in a touch screen device. A system or computer program may provide detecting a touch gesture by a user on a first portion of displayed content on a touch display. The first portion may include a drillable data element having at least a first dimension, a second dimension and a third dimension. The system or computer program may further provide detecting information associated with the touch gesture, determining a requested drilling action based at least in part on the detected information, the requested drilling action including at least one of a change of a displayed drill dimension and a change of a displayed drill degree, sending the requested drilling action of the first portion to a report server and presenting a drilled first portion on the touch display.

12 Claims, 10 Drawing Sheets

(56) References Cited

U.S. PATENT DOCUMENTS

| | | | |
|---|---|---|---|
| 8,527,909 B1* | 9/2013 | Mullany | 715/863 |
| 8,832,588 B1* | 9/2014 | Kerzner et al. | 715/781 |
| 2003/0128212 A1* | 7/2003 | Pitkow | 345/440 |
| 2004/0189717 A1 | 9/2004 | Conally et al. | |
| 2006/0026535 A1 | 2/2006 | Hotelling et al. | |
| 2006/0107196 A1* | 5/2006 | Thanu et al. | 715/503 |
| 2009/0313220 A1 | 12/2009 | Best et al. | |
| 2010/0088641 A1 | 4/2010 | Choi | |
| 2010/0162181 A1* | 6/2010 | Shiplacoff et al. | 715/863 |
| 2010/0283743 A1* | 11/2010 | Coddington | 345/173 |
| 2011/0115814 A1* | 5/2011 | Heimendinger et al. | 345/619 |
| 2011/0239110 A1 | 9/2011 | Garrett et al. | |
| 2011/0283231 A1* | 11/2011 | Richstein et al. | 715/810 |
| 2011/0316884 A1* | 12/2011 | Giambalvo et al. | 345/660 |
| 2012/0162265 A1* | 6/2012 | Heinrich et al. | 345/661 |
| 2012/0166470 A1* | 6/2012 | Baumgaertel et al. | 707/769 |
| 2012/0180002 A1* | 7/2012 | Campbell et al. | 715/863 |
| 2013/0111321 A1* | 5/2013 | Dorrell | 715/215 |
| 2014/0149947 A1* | 5/2014 | Blyumen | 715/863 |

OTHER PUBLICATIONS

Studio Six Digital, "SPL Graph", downloaded Feb. 20, 2012, 3 pp., http://itunes.apple.com/us/app/spl-graph/id307451201?mt-8, copyright 2011, Apple, Inc.

iPhone SDK Articles, "UITableView—Drill down table view tutorial", downloaded Feb. 14, 2012, post dated Mar. 8, 2009, 11 pages, www.iphonesdkarticles.com/2009/03/uitableview-drill-down-table-view.html, copyright 2011, iPhone SDK Articles.

IBM, IBM Cognos Business Intelligence 10.1.0 documentation, http://www-01.ibm.com/support/knowledgecenter/SSEP7J_10.1.0/com.ibm.swg.im.cognos.cbi.doc/welcome.html?cp=SSEP7J_10.1.0°/02F0&Iang=en, Last retrieved Jul. 22, 2013.

BIDW, Hierarchies in Business Objects Universe, http://www.bidw.org/business-objects/universe-design/hierarchies-inbusiness-objects-universe/, Last retrieved Sep. 27, 2013.

* cited by examiner

|       | 2009 |    |    |    | 2010 |    |    |    |
|-------|------|----|----|----|------|----|----|----|
|       | Q1   | Q2 | Q3 | Q4 | Q1   | Q2 | Q3 | Q4 |
| City 1 | XX | XX | XX | XX | XX | XX | XX | XX |
| City 2 | XX | XX | XX | XX | XX | XX | XX | XX |
| City 3 | XX | XX | XX | XX | XX | XX | XX | XX |
| City 4 | XX | XX | XX | XX | XX | XX | XX | XX |
| City 5 | XX | XX | XX | XX | XX | XX | XX | XX |
| City 6 | XX | XX | XX | XX | XX | XX | XX | XX |

*Fig. 6*

|         | 2009 | 2010 | 2011 |
|---------|------|------|------|
| State 1 | YY   | YY   | YY   |
| State 2 | YY   | YY   | YY   |
| State 3 | YY   | YY   | YY   |
| State 4 | YY   | YY   | YY   |
| State 5 | YY   | YY   | YY   |

DRILLING OF DISPLAYED CONTENT IN A TOUCH SCREEN DEVICE

BACKGROUND

The present invention relates generally to methods and systems that allow a user to interact with displayed content on a display device, and more specifically, to methods and systems that allow a user to drill displayed content on a touch screen display device.

There are circumstances in which a user must explore vast quantities of data. In business intelligence applications, this may be done in order to diagnose a problem, understand a cause and effect or discover trends.

BRIEF SUMMARY

According to another embodiment of the present invention, a computer program product may include a computer readable storage medium having computer readable program code embodied therewith. The computer readable program code, when read by a processor, may be configured to detect a touch gesture by a user on a first portion of displayed content on a touch display. The first portion may include a drillable data element having at least a first dimension, a second dimension and a third dimension. The computer readable program code may be further configured to detect information associated with the touch gesture, determine a requested drilling action based at least in part on the detected information, the requested drilling action including at least one of a change of a displayed drill dimension and a change of a displayed drill degree, send the requested drilling action of the first portion to a report server and present a drilled first portion on the touch display.

In some embodiments of the present invention, the computer readable program code may be further configured to detect a touch gesture orientation with respect to the displayed content and determine the change of displayed drill dimension of the requested drilling action based at least in part on the touch gesture orientation. Additionally and/or alternatively, in some embodiments of the present invention, the computer readable program code may be further configured to detect a touch gesture distance traveled and determine the change of displayed drill degree of the requested drilling action based at least in part on the touch gesture distance traveled. Additionally and/or alternatively, in some embodiments of the present invention, the data element may be displayed in a first level of a hierarchy with respect to at least one of the first, second and third dimensions, and the drilled first portion may include a second data element displayed in a second level of the hierarchy with respect to at least one of the first, second and third dimensions.

In yet another embodiment of the present invention, a computer is provided. The computer may include a processor, a memory and/or a program including a plurality of instructions stored in the memory. The plurality of instructions may be executed by the processor to detect a touch gesture by a user on a first portion of displayed content on a touch display. The first portion may include a drillable data element having at least a first dimension, a second dimension and a third dimension. The plurality of instructions may be further executed by the processor to detect information associated with the touch gesture, determine a requested drilling action based at least in part on the detected information, the requested drilling action including at least one of a change of a displayed drill dimension and a change of a displayed drill degree, send the requested drilling action of the first portion to a report server and present a drilled first portion on the touch display.

In some embodiments of the invention, the plurality of instructions may be further executed by the processor to detect a touch gesture orientation with respect to the displayed content and determine the change of displayed drill dimension of the requested drilling action based at least in part on the touch gesture orientation. Additionally and/or alternatively, in some embodiments of the invention, the plurality of instructions may be further executed by the processor to detect a touch gesture distance traveled and determine the change of displayed drill degree of the requested drilling action based at least in part on the touch gesture distance traveled.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF cable, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
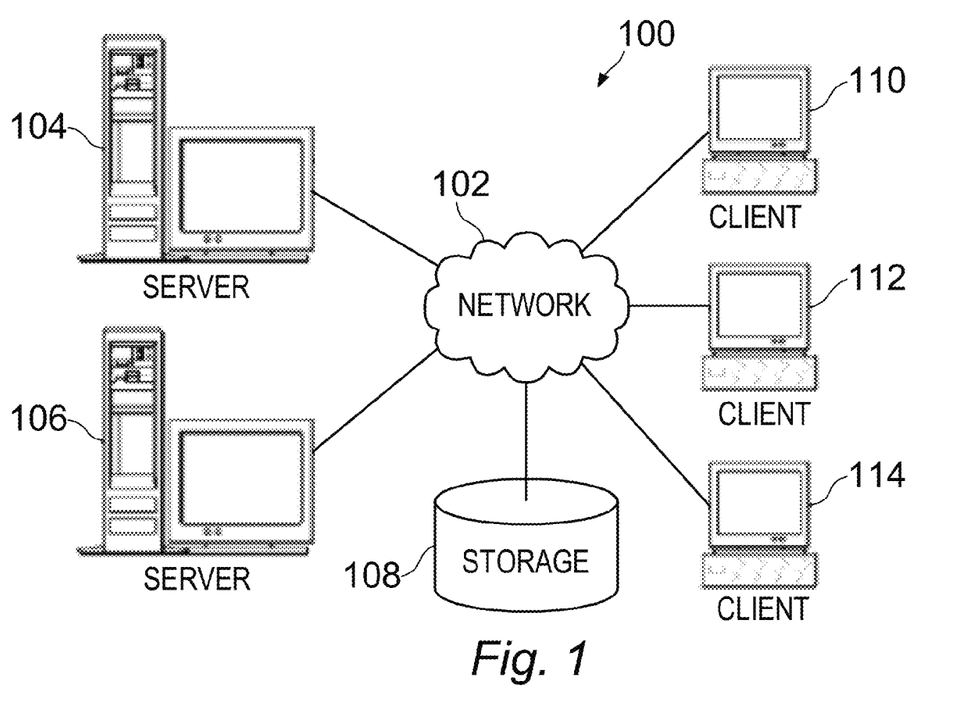
FIG. 1 is a pictorial representation of an example of a computer system in which illustrative embodiments may be implemented.
Figure 2:
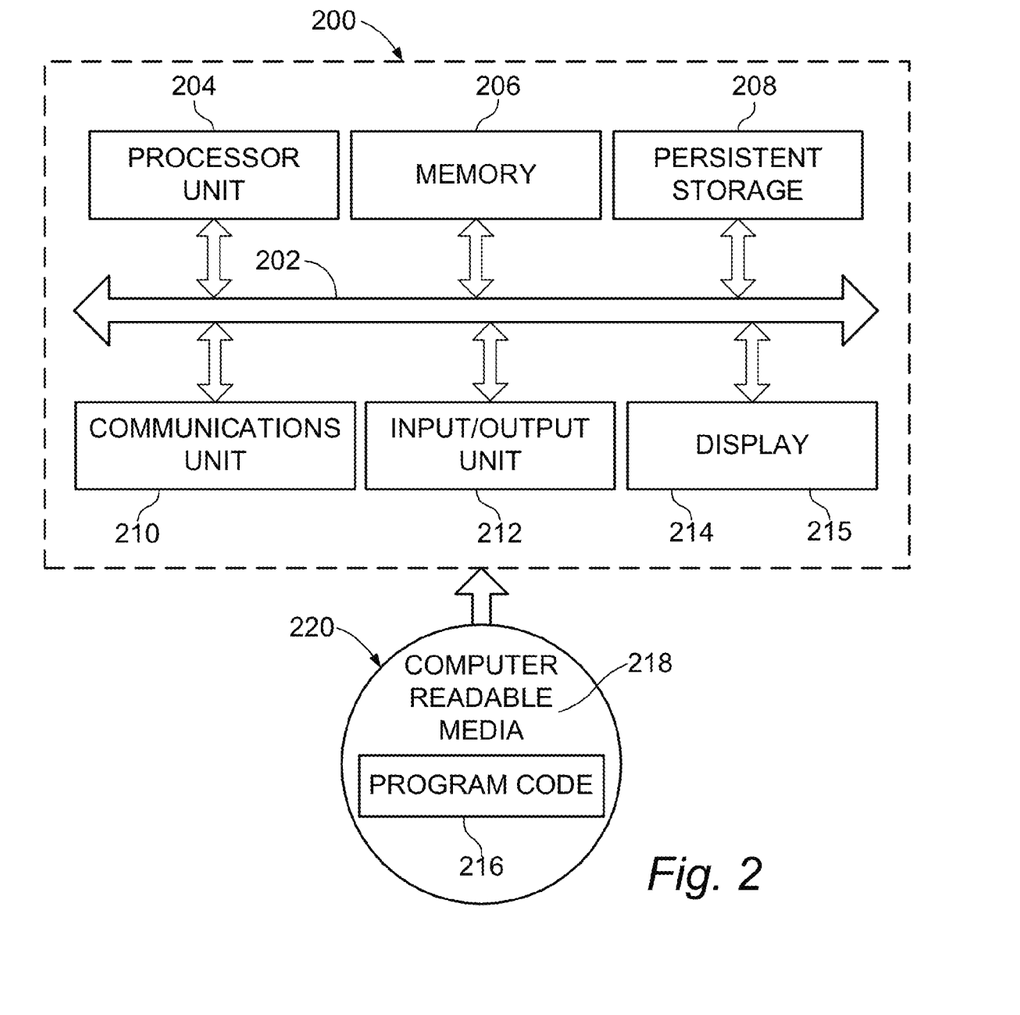
FIG. 2 is a block diagram of an example of a computer in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a computer system, indicated generally at 100, and including a network of computers in which illustrative embodiments may be implemented. Computer system 100 may contain a network 102, which is the medium used to provide communications links between various devices and computers connected together within computer system 100. Network 102 may include connections, such as wire, wireless communication links, or fiber optic cables.

In the depicted example, a server 104 and a server 106 may connect to network 102 along with a storage unit 108. In addition, a first client computer 110, a second client computer 112, and a third client computer 114 may connect to network 102. Client computers 110, 112, and 114 may be, for example, personal computers or network computers. In the depicted example, server 104 may provide data, such as boot files, operating system images, and/or software applications to client computers 110, 112, and 114. Client computers 110, 112, and 114 are clients to server 104 in this example. Computer system 100 may include additional servers, clients, and other devices not shown, or may include fewer devices than those shown.

In the depicted example, network 102 may be or may include the Internet. Computer system 100 also may be implemented with a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer or a computer system, such as a server, a client computer, a gaming system, a personal digital assistant (pda), a smart phone, a mobile device or any other computer or device that functions like a computer, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 may serve to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device may include any piece of hardware that is capable of storing information either on a temporary basis and/or a permanent basis. Memory 206 may include, for example, a random access memory or any other suitable volatile or non-volatile storage device. Persistent storage 208 may take various forms depending on the particular implementation. For example, persistent storage 208 may contain one or more components or devices. For example, persistent storage 208 may include a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210 may provide for communications with other data processing systems or devices and/or one or more networks such as a local area network (LAN), a general wide area network (WAN), and/or a public network (e.g., the Internet). Some embodiments of communications unit 210 may include a network interface card. Communications unit 210 may provide communications through the use of either or both physical and wireless communications links.

Input/output unit 212 may allow for input and output of data with other devices that may be connected to data processing system 200. For example, input/output unit 212 may provide a connection for user input through a keyboard and mouse. Further, input/output unit 212 may send output to a printer. Display 214 may provide a mechanism to display information to a user. Display 214 may include a touch screen 215.

Instructions for the operating system and applications or programs may be located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 may be located in a functional form on computer-readable media 218 that is selectively removable and may be loaded onto or transferred to data processing system 200 for execution by processor unit 204. Program code 216 and computer-readable media 218 may form computer program product 220. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 may include hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. The bus system may be implemented using any suitable type of architecture that provides for a transfer of data between different components or devices attached to the bus system. Additionally, a communications unit may include one or more devices used to transmit and receive data, such as a modem or a network adapter. Further, a memory may include, for example, memory 206 or a cache such as found in an interface and memory controller hub that maybe present in communications fabric 202.

A computer or computer system, such as those depicted in FIGS. 1 and 2, may provide a method and/or a system of drilling displayed content in a touch screen device. For example, data processing system 200 and/or computer system 100 may include a touch screen system. A touch screen system may allow a user to control operation of a computing device including a touch screen by touching the touch screen. For example, a user may input a command to the device by touching on or near a designated portion of the touch screen. The touch screen system may provide an intuitive method by which the user may easily interact with and control various functions performed by the device. The touch screen may be produced in a variety of types and sizes and may be used with or in a wide variety of computing devices, such as personal computers, portable consumer electronics (e.g., mobile telephones, personal digital assistants, handheld computers, video game devices, etc.), kiosks, domestic appliances, vehicle information systems (e.g., GPS locators), and industrial equipment and tools.

For example, the display device 214 may incorporate touch screen 215 that may be coupled to the processor unit 204 by way of bus 202. The touch screen 215 may include resistive, capacitive, surface acoustic wave ("SAW"), infrared ("IR"), strain gauge, dispersive signal technology, acoustic pulse recognition, pressure sensitive technology and optical touch sensing technology, as would be readily understood by a person of ordinary skill in the art having the benefit of the present disclosure.

The touch screen 215 may communicate a detection of a touch gesture (e.g., a touch gesture with user's finger(s), stylus(es), pen(s), or other object (s)) on or near the touch screen 215). The touch gesture may include one or more impact locations, for example the touch gesture may be made with two of the user's fingers.

Additionally, the touch screen 215 may communicate information associated with the touch gesture. Information associated with the touch gesture may include a touch gesture location A on the touch screen 215, direction of movement of the touch gesture towards or away from the location A, distance traveled by the touch gesture (for example, the distance between the location A to a location B), touch gesture orientation with respect to displayed content on the touch screen 215 and/or the level of pressure of the touch gesture. The touch gesture information may be communicated via bus 202.

Touch screen 215 may include displayed content, such as data collected for one or more attributes, measurements, or metrics of interest. As used herein, an attribute may include a characteristic of an item, a measurement may include a measured value, and a metric may include a calculation based on one or more attributes and/or measurements.

While collected data may be displayed in simple list or tabular form, if the object of the application is to allow the operator to draw conclusions from the collected data, it is often more useful to display the collection of data in the format of some sort of report or chart (e.g., a line graph, a pareto chart, etc.) which allows the operator to visually detect trends in the data. It may be useful to display additional information about the collected data or present it in other visually useful formats. In business intelligence applications, this may be done in order to diagnose a problem, understand a cause and effect or discover trends. Often such tasks utilize query and reporting tools to search a data warehouse, which permit a user to drill down and examine data that may be presented in tabular and or graphical formats.

The ability to display additional information for a given view of a data element is referred to herein as having drill-down capability and/or being drillable. Data elements may be included within lists, tables, charts, or graphics. A data element with drill-down capability is considered a parent data element of its drill-down data elements(s), and each drill-down data element is considered a child of its parent data element. In addition, each child data element may in turn be considered a parent data element to its own child data element(s) if more data is available to drill-down to. The lowest level of detail (sometimes called the grain) may be referred to herein as base level data or underlying data of the data element. In other words, when a drill-down mechanism is activated, child data elements containing detailed information about a parent data element may be displayed. The data elements displayed may be selected based on the context of the parent data element.

Dimensions contain a set of unique values that identify and categorize data elements. Data elements may be multidimensional, for example a data element may include at least a first dimension, a second dimension and a third dimension. Exemplary dimensions include in the context of business intelligence include, but are not limited to, time (order date, invoice date, shipping date etc), customer, product, geographic location, supplier and/or channel of sale (i.e. internet, mail order etc).

As described above, data organization and/or display may include a hierarchy to organize data at different levels of aggregation. In viewing data, business analysts may use dimension hierarchies to recognize trends at one level, drill down to lower levels to identify reasons for these trends, and roll or drill up to higher levels to see what affect these trends have on a larger sector of the business. Each level may represent a position in the hierarchy. Each level above the base level data contains aggregate values for the levels below it. The data elements at different levels may include a one-to-many parent-child relation. Hierarchies and levels may have a many-to-many relationship. A hierarchy typically contains several levels, and a single level can be included in more than one hierarchy.

For example, with reference to a time dimension, suppose a data warehouse contains snapshots of data taken three times a day, that is, every 8 hours. Analysts might normally prefer to view the data that has been aggregated into days, weeks, quarters, or years. Thus, the Time dimension may include a hierarchy with at least five levels.

Similarly, a sales manager with a particular target for the upcoming year might want to allocate that target amount among the sales representatives in his territory; the allocation requires a dimension hierarchy in which individual sales representatives are the child values of a particular territory.

Figure 3:
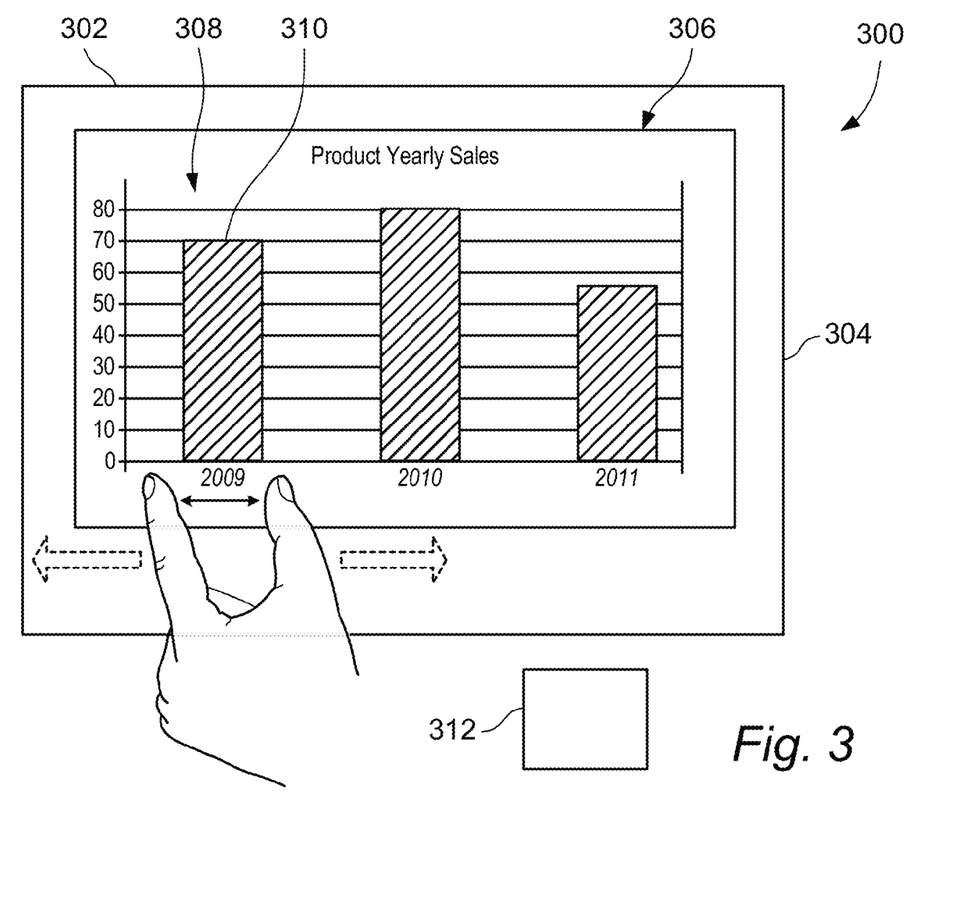
FIG. 3 is a pictorial representation of an example of a touch screen display including displayed content having a first portion, the first portion including a drillable data element displayed at a first level in a time dimension hierarchy, and an exemplary drill-down touch gesture.

Non-limiting examples of drilling displayed content in a touch screen device may be described with reference to FIGS. 3-7. Turning first to FIG. 3, a system 300 may include a display device 302 having a touch screen 304. The touch screen 304 may include displayed content 306, here a business intelligence report. The system 300 may detect a touch gesture and/or information associated with the touch gesture.

The detected information may include a location of the touch gesture on the touch screen 304 and/or displayed content 306. The determination of which data element(s) to perform a requested drilling action on may be based in part on the location of the touch gesture. In the example shown, the location of the touch gesture includes a first portion 308 of the displayed content 306, the first portion 308 having a drillable data element 310.

The drillable data element 310 may include a first dimension, a second dimension and a third dimension. The drillable data element 310 may be displayed with respect to the first dimension and the second dimension. In the embodiment shown, the first dimension includes a time dimension along an X-axis and the second dimension includes a sales amount dimension along a Y-axis. Non-limiting examples of the third dimension may include geographic area, customer, product, supplier or channel of sale (i.e. internet, mail order etc). The drillable data element 310 may also be displayed with respect to a first level of a hierarchy with respect to one of the first, second and third dimensions. For example, the drillable data element 310 may be displayed in the time dimension along the X-axis at a yearly level.

The detected information may further include a touch gesture orientation with respect to the displayed content 306. A determination of the change of displayed drill dimension of the requested drilling action may be based at least in part on the touch gesture orientation. In some embodiments, a touch gesture orientation that is parallel with respect a displayed dimension may indicate a drilling up or drilling down requested action. In some embodiments, a touch gesture orientation that is oblique with respect to a displayed dimension may indicate a cross-drilling requested action. In the example shown, the touch gesture orientation with respect to the displayed content 306 is parallel to the time dimension along the X-axis.

The detected information may further include a touch gesture direction of movement towards or away from the data element 310. The detected touch gesture direction may indicate whether the requested drilling action includes drilling down the data element 310 or drilling up the data element 310. In the example shown, the touch gesture direction is moving away from the data element 310 as indicated by the directional arrows.

The detected information may further include a touch gesture distance traveled. The determination of a change of displayed drill degree of the requested drilling action based at least in part on the touch gesture distance traveled. In other words, the change of displayed drill degree may include moving from a displayed first level to a displayed second level and may include moving from the displayed first level to a displayed fifth level, based at least in part on the touch gesture distance.

The requested drilling action of the first portion 308 may be sent to a report server 312 by any means known to those skilled in the art. The report server 312 may be remote from the system 300. The report server 312 may store the underlying data of the displayed content and/or may build/deploy database and reporting applications. The report server 312 may receive the requested drilling action, apply the requested drilling action to the data and send a drilled first portion to the system 300.

Figure 4:
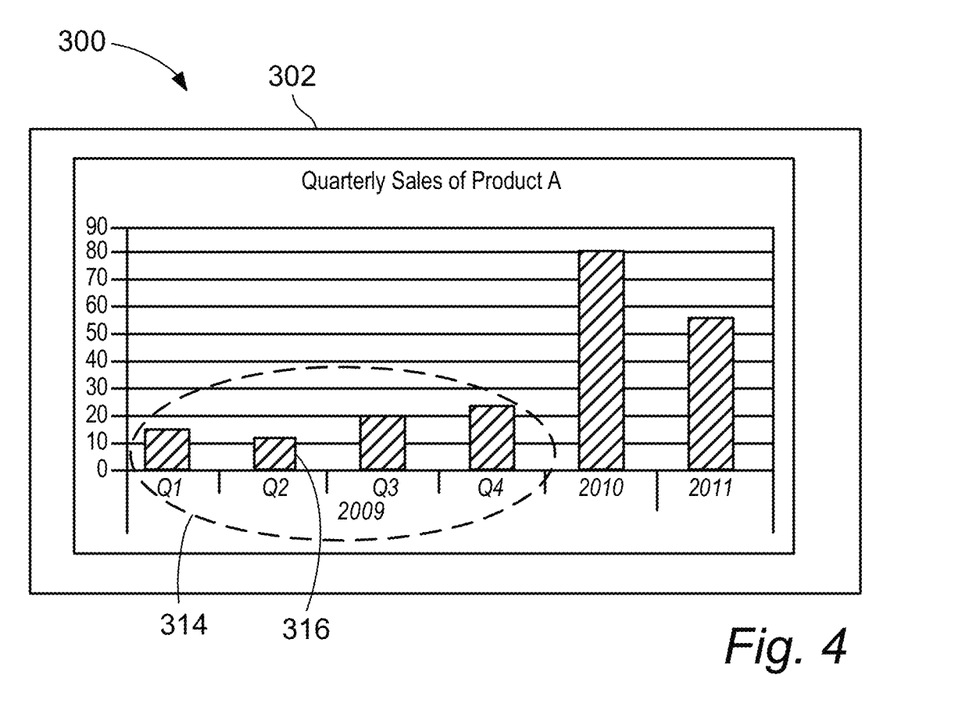
FIG. 4 is a pictorial representation of the example in FIG. 3, showing a drilled first portion including a further data element displayed at a second level in the time dimension hierarchy.

FIG. 4 shows an exemplary drilled first portion 314 on the display 302. As noted above, the detected touch gesture orientation included the time dimension X-axis. The touch gesture direction was away from the data element 310. Accordingly, in this example the data element 310 is drilled down in the time dimension. The change of displayed drill degree of the requested drilling action included a change from the data element 310 displayed first level, yearly, to a second data element 316 in a displayed second level, a quarterly level within the time dimension hierarchy. In the example show, the exemplary drilled first portion 314 includes a partial drill down of the displayed report 306. In other words, only the data element 310 for the year 2009 was drilled. Other embodiments, the drilled first portion 314 may include a full drill down of a displayed dimension.

Figure 5:
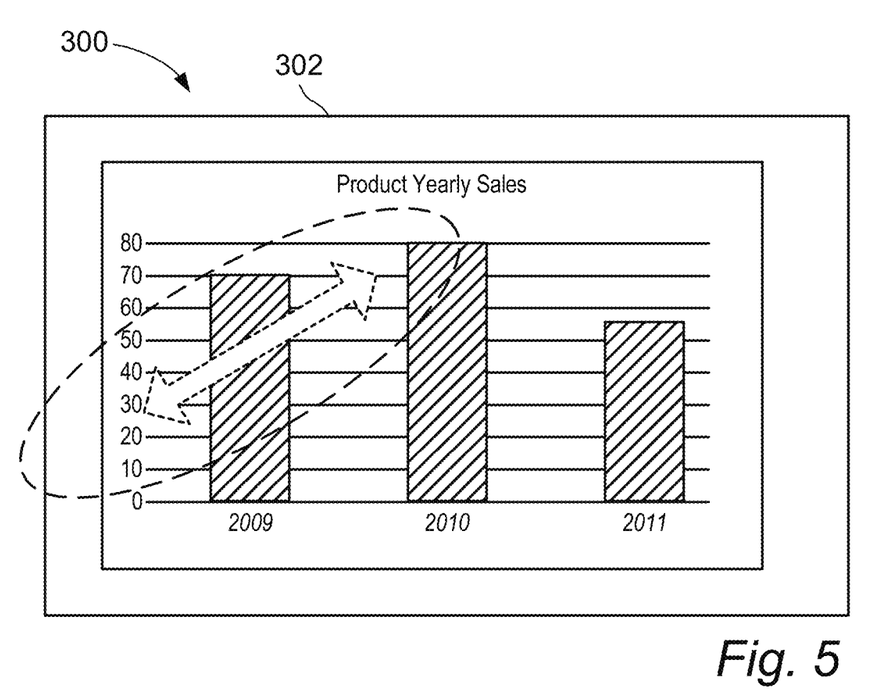
FIG. 5 is a pictorial representation of the example in FIG. 3, showing the first portion including the drillable data element having a displayed first dimension and a displayed second dimension and an exemplary cross-drill touch gesture.

FIG. 5 shows another example of a requested drill action, also referred to as a cross-drilling action. Here, the detected touch gesture information includes an oblique orientation with respect to one or more of the displayed dimension axes. The requested drilling action based at least in part on the touch gesture orientation may include a change in displayed dimension. For example, as shown in FIG. 6, a drilled first portion 318 may include a displayed third dimension, such as a location dimension.

Figure 6:
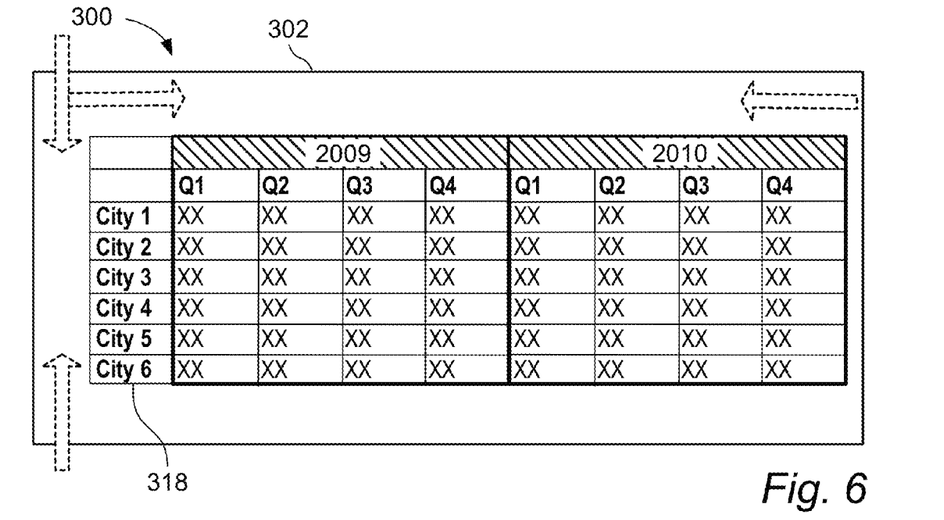
FIG. 6 is a pictorial representation of the example in FIG. 5, showing a drilled first portion including a further data element having a displayed third dimension and exemplary drill-up touch gestures parallel to both displayed dimensions.
Figure 7:
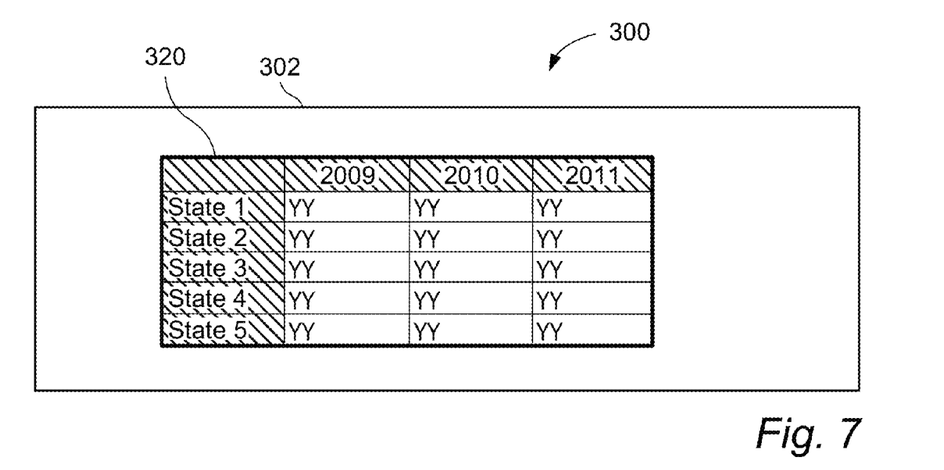
FIG. 7 is a pictorial representation of the example in FIG. 6, showing a drilled further data element displayed at a second level in both displayed dimensions hierarchies.

As indicated by the directional arrows in FIG. 6, the drilled first portion 318 may also be drilled. Here, a requested drilling action may include a drill up action in the two displayed dimensions, based at least in part on the inward direction movement and parallel orientation with respect to the displayed dimensions. A drilled second portion 320 is shown in FIG. 7.

Figure 8:
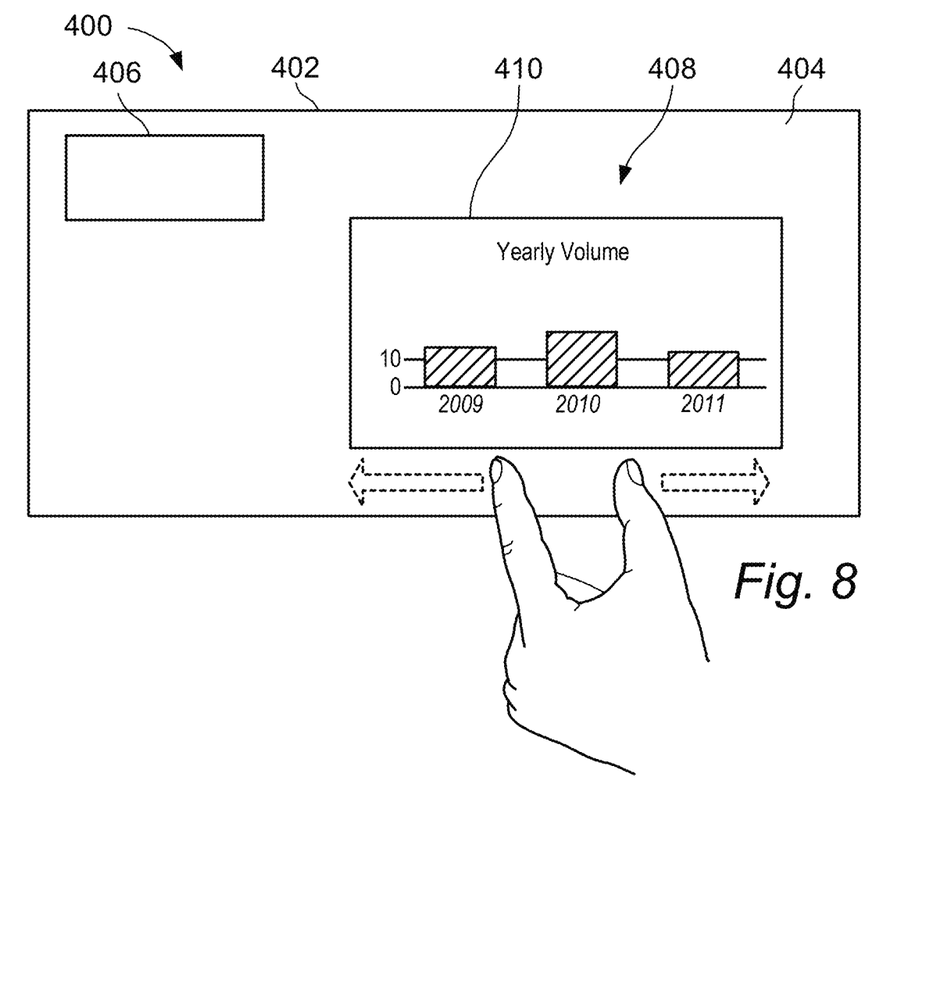
FIG. 8 is a pictorial representation of an example of a touch screen display including a mode change option and displayed content displayed in a first size relative to the touch screen display.
Figure 9:
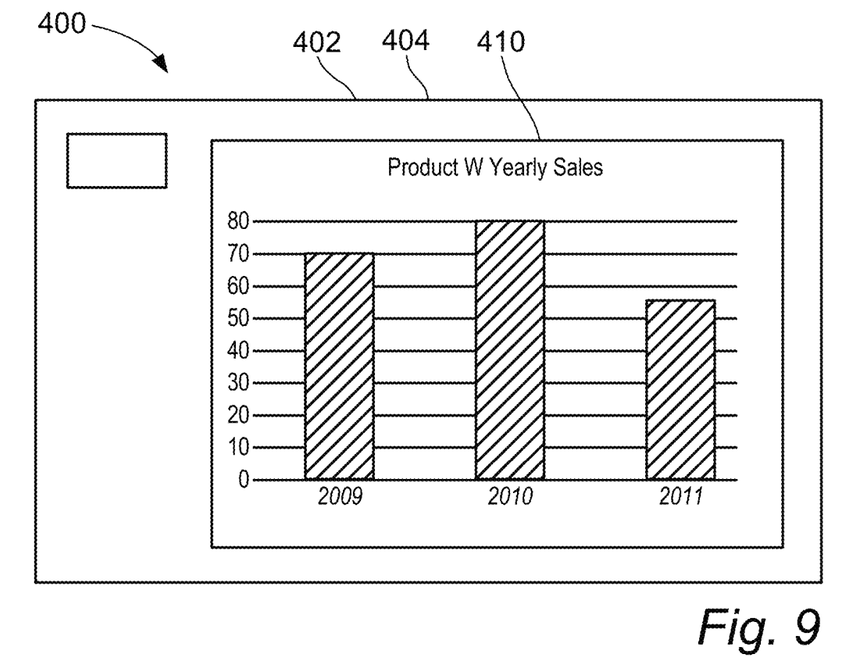
FIG. 9 is a pictorial representation of the example in FIG. 8, showing displayed content displayed in a second size relative to the touch screen display.

Additionally and/or alternatively, as shown in FIGS. 8 and 9, some embodiments may include an option to resize a digital object displayed on a touch screen of a display system. For example, a system 400 may include a display device 402 having a touch screen 404 and a mode change option 406. The touch screen 404 may include displayed content 408 including a digital object 410 having a first size relative to the display device 402 (FIG. 8). Activation of the mode change option 406, for example by touching the portion of the touch screen 404 including the mode change option 406, may cause the system 400 to switch from a drilling mode to a re-sizing mode. In the re-sizing mode, the displayed content 410 may be re-sized to a second size relative to the display device 402 (FIG. 9).

Figure 10:
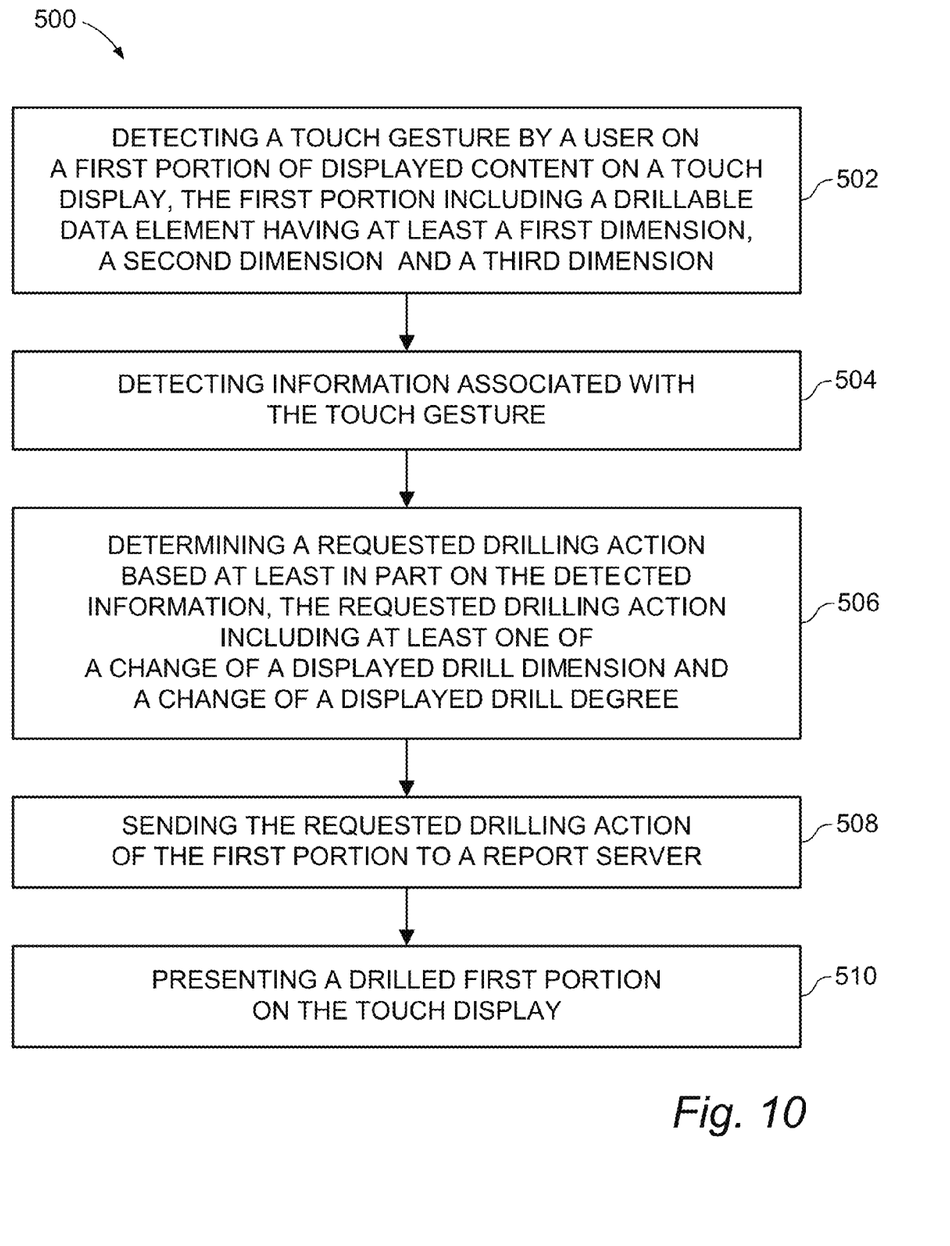
FIG. 10 is an example of a method of drilling displayed content in a touch screen device.

Referring now to FIG. 10, an example of a method 500, implemented in a computer system, of drilling displayed content in a touch screen device is provided. While FIG. 5 shows exemplary steps of a method according to one embodiment, other embodiments may omit, add to, and/or modify any of the steps shown in that figure. In step 502, a touch gesture by a user on a first portion of displayed content on a touch display may be detected. The first portion may include a drillable data element having at least a first dimension, a second dimension and a third dimension. In step 504, information associated with the touch gesture may be detected. In step 506, a requested drilling action based at least in part on the detected information may be determined. The requested drilling action may include at least one of a change of a displayed drill dimension and a change of a displayed drill degree. In step 508, the requested drilling action of the first portion may be sent to a report server and in step 510, a drilled first portion may be displayed on the touch display.

Method 500 may include other steps. For example, method 500 may include detecting a touch gesture orientation with respect to the displayed content and determining the change of displayed drill dimension of the requested drilling action based at least in part on the touch gesture orientation. Additionally and/or alternatively, method 500 may include detecting a touch gesture distance traveled and determining the change of displayed drill degree of the requested drilling action based at least in part on the touch gesture distance traveled.

In some embodiments of method 500, the data element may be displayed in a first level of a hierarchy with respect to at least one of the first, second and third dimensions, and the drilled first portion may include a second data element displayed in a second level of the hierarchy with respect to at least one of the first, second and third dimensions. Additionally and/or alternatively, the requested drilling action may include a request for the underlying data of the data element and presenting the drilled first portion on the touch display may include presenting the underlying data of the data element. Additionally and/or alternatively, the displayed content may include a drillable business intelligence report. Additionally and/or alternatively, the touch gesture may include two contact points. Additionally and/or alternatively, the touch gesture information may include a touch gesture direction of movement towards or away from the data element.

Figure 11:
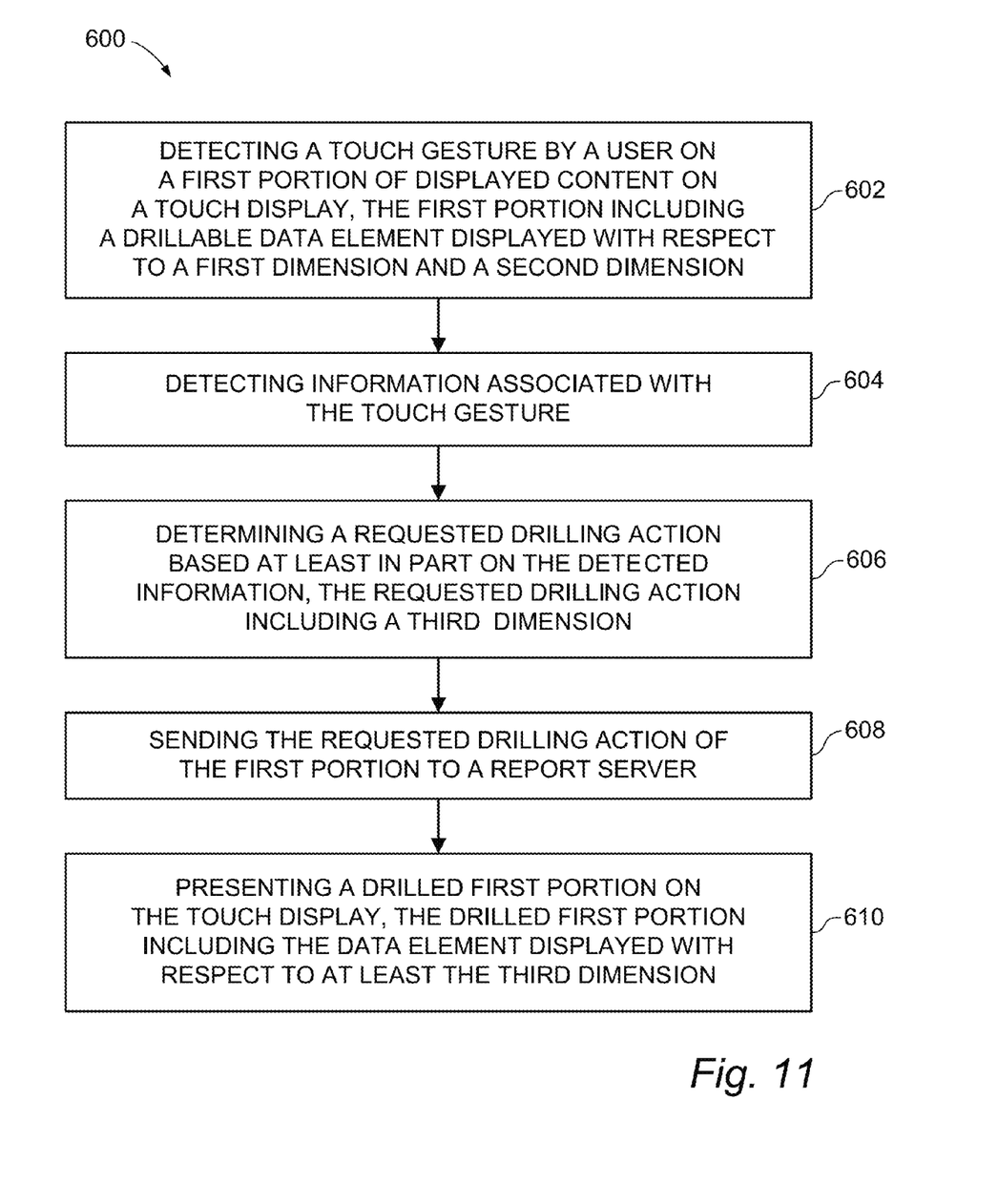
FIG. 11 is an example of a method of drilling displayed content in a touch screen device.

Referring now to FIG. 11, a further example of a method 600, implemented in a computer system, of drilling displayed content in a touch screen device is shown. While FIG. 11 shows exemplary steps of a method according to one embodiment, other embodiments may omit, add to, and/or modify any of the steps shown in that figure. In step 602, a touch gesture by a user on a first portion of displayed content on a touch display may be detected. The displayed content may include a drillable data element displayed with respect to a first dimension and a second dimension. In step 604, information associated with the touch gesture may be detected. In step 606, a requested drilling action based at least in part on the detected information may be determined. The requested drilling action may include a third dimension. In step 608, a requested drilling action of the first portion may be sent to a report server and in step 610, a drilled first portion may be presented on the touch display. The dilled first portion may include the data element displayed with respect to at least the third dimension.

Method 600 may include other steps. For example, method 600 may include determining a requested degree of drilling of the first portion based at least in part on the detected information. Additionally and/or alternatively, in some embodiments of method 600, the requested drilling action may include a request for the underlying data of the data element and presenting the drilled first portion on the touch display includes presenting the underlying data of the data element. Additionally and/or alternatively, the displayed content may include a business intelligence report. Additionally and/or alternatively, the touch gesture may include two contact points. Additionally and/or alternatively, the touch gesture information may include a touch gesture direction of movement towards or away from the data element.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Some embodiments of the present invention may additionally and/or alternatively be described as use of finger movements on a multi-touch screen device to navigate a business intelligence report. Based on finger gesture, the report may drill down, drill up or drill across. The level of drilling may depend on distance travelled by the finger on the touch screen. Based on finger gesture, the report drilling action is sent to the database on the report server. The invention also supports finger gestures for cross-drilling.

Additionally, and/or alternatively, some embodiments of the present invention may additionally and/or alternatively be described as a system or a method of dynamically expanding or contracting contents of documents using finger touch on a multi-touch screen device. More specifically, a system or a method of dynamically expanding or contracting the contents of documents using finger touch, wherein expanding or contracting may be dependent on distance traveled by the fingers on the multi-touch screen device and/or drilling action is sent to the server for obtaining modified data and altering the content, modifying the content based on the drilling actions sent to the server.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product comprising:
at least one non-transitory computer readable storage medium having computer readable program code embodied therewith, the computer readable program code, when read by a processor, configured to:
detect a touch gesture by a user on a first portion of a report displayed on a touch display, the first portion including a drillable data element having at least a first dimension and a second dimension, wherein the first dimension is presented along an x-axis of the displayed report and the second dimension is presented along a y-axis of the displayed report;
detect information associated with the touch gesture, the information associated with the touch gesture comprising an orientation of the touch gesture;
determine a requested drilling action based at least in part on the orientation of the touch gesture, the requested drilling action including at least one of a change of a displayed drill dimension and a change of a displayed drill degree of the first portion of the displayed report, wherein the dimension presented along the x-axis and the dimension presented along the y-axis are changed in response to the orientation of the touch gesture being an oblique orientation;
send the requested drilling action of the first portion to a report server; and
present a drilled first portion on the touch display, wherein one or more other portions of the displayed report remain visible and maintain a displayed drill dimension and a displayed drill degree while at least one of the displayed drill dimension and displayed drill degree of the first portion is changed.

2. The computer program product of claim 1 wherein the computer readable program code, when read by a processor, is further configured to:
detect a touch gesture distance traveled; and
determine the change of displayed drill degree of the requested drilling action based at least in part on the touch gesture distance traveled.

3. The computer program product of claim 1 wherein:
the drillable data element is displayed in a first level of a hierarchy with respect to at least one of the first dimension and the second dimension; and
the drilled first portion includes a second data element displayed in a second level of the hierarchy with respect to at least one of the first dimension and the second dimension.

4. A computer, comprising:
a processor;
a memory; and
a program including a plurality of instructions stored in the memory that are executed by the processor to:
   detect a touch gesture by a user on a first portion of a report displayed on a touch display, the first portion including a drillable data element having at least a first dimension and a second dimension, wherein the first dimension is presented along an x-axis of the displayed report and the second dimension is presented along a y-axis of the displayed report;
   detect information associated with the touch gesture, the information associated with the touch gesture comprising an orientation of the touch gesture;
   determine a requested drilling action based at least in part on the orientation of the touch gesture, the requested drilling action including at least one of a change of a displayed drill dimension and a change of a displayed drill degree of the first portion of the displayed report, wherein the dimension presented along the x-axis and the dimension presented along the y-axis are changed in response to the orientation of the touch gesture being an oblique orientation;
   send the requested drilling action of the first portion to a report server; and
   present a drilled first portion on the touch display, wherein one or more other portions of the displayed report remain visible and maintain a displayed drill dimension and a displayed drill degree while at least one of the displayed drill dimension and displayed drill degree of the first portion is changed.

5. The computer of claim 4, wherein the plurality of instructions further includes instructions that are executed by the processor to:
   detect a touch gesture distance traveled; and
   determine the change of displayed drill degree of the requested drilling action based at least in part on the touch gesture distance traveled.

6. The computer of claim 4, wherein:
   the displayed report includes a drillable business intelligence report.

7. The computer of claim 4, wherein:
   the touch gesture includes two contact points.

8. The computer of claim 4, wherein:
   the touch gesture information includes a touch gesture direction of movement towards or away from the drillable data element.

9. The computer program product of claim 1, wherein the change of the displayed drill dimension comprises drilling down into at least a portion of one or more of the first dimension along the x-axis and the second dimension along the y-axis.

10. The computer of claim 4, wherein the change of the displayed drill dimension comprises drilling down into at least a portion of one or more of the first dimension along the x-axis and the second dimension along the y-axis.

11. The computer program product of claim 1, wherein the detected information comprises one or more of detecting an x-axis component of the touch gesture and a y-axis component of the touch gesture and wherein determining a requested drilling action for a change of a displayed drill dimension or a drill degree along the x-axis is in response to the detected information comprising detecting an x-axis component of the touch gesture and determining a requested drilling action for a change of a displayed drill dimension or a drill degree along the y-axis is in response to the detected information comprising detecting an y-axis component of the touch gesture.

12. The computer of claim 4, wherein the detected information comprises one or more of detecting an x-axis component of the touch gesture and a y-axis component of the touch gesture and wherein determining a requested drilling action for a change of a displayed drill dimension or a drill degree along the x-axis is in response to the detected information comprising detecting an x-axis component of the touch gesture and determining a requested drilling action for a change of a displayed drill dimension or a drill degree along the y-axis is in response to the detected information comprising detecting an y-axis component of the touch gesture.

* * * * *